F. E. COOMBS.
DEFECATION OF SACCHARINE LIQUIDS.
APPLICATION FILED JAN. 2, 1909.
958,907.
Patented May 24, 1910.
3 SHEETS—SHEET 1.
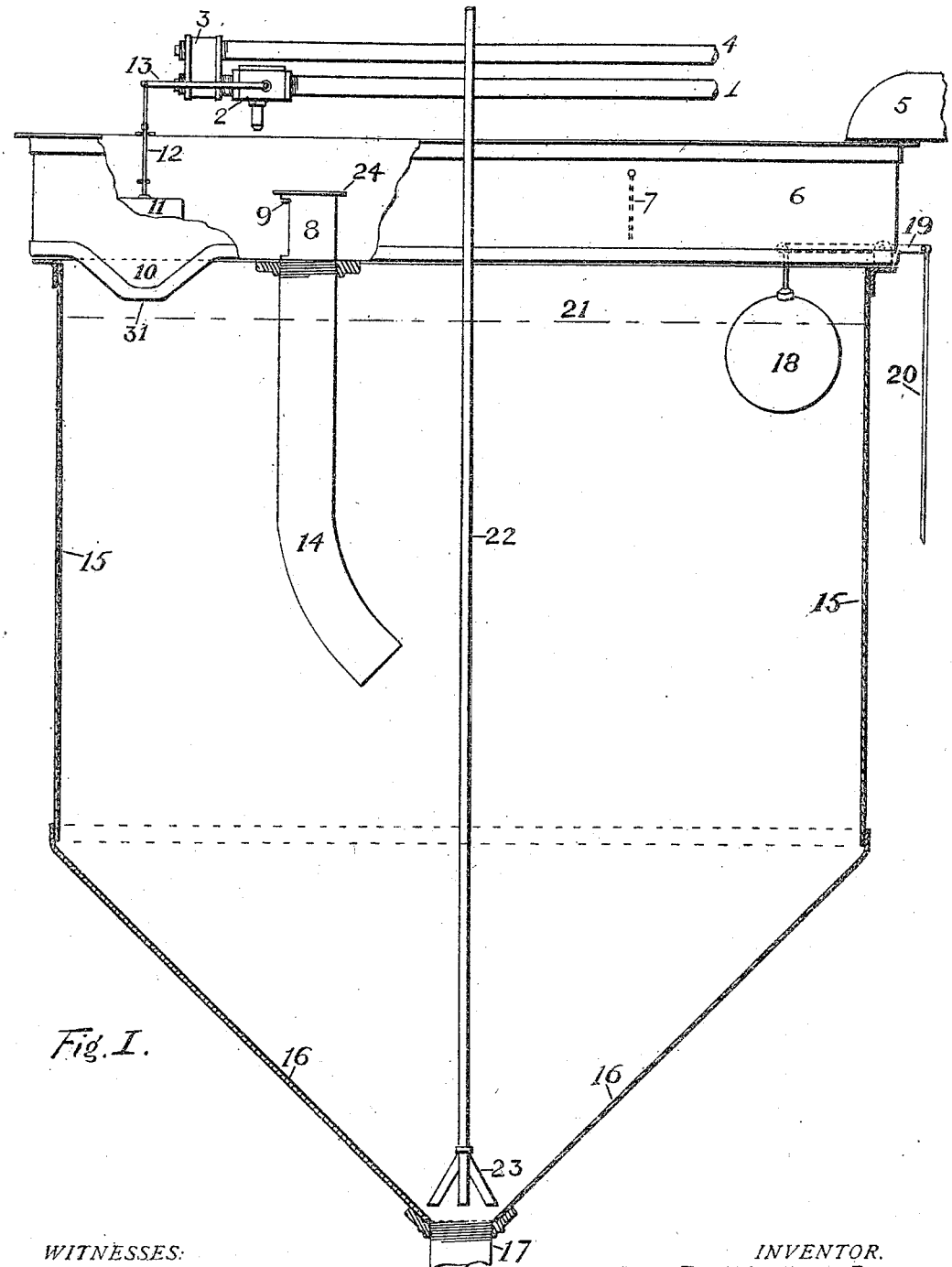
Fig. I.
WITNESSES:
INVENTOR.
Frank E. Coombs
BY
K. P. McElroy
ATTORNEY.

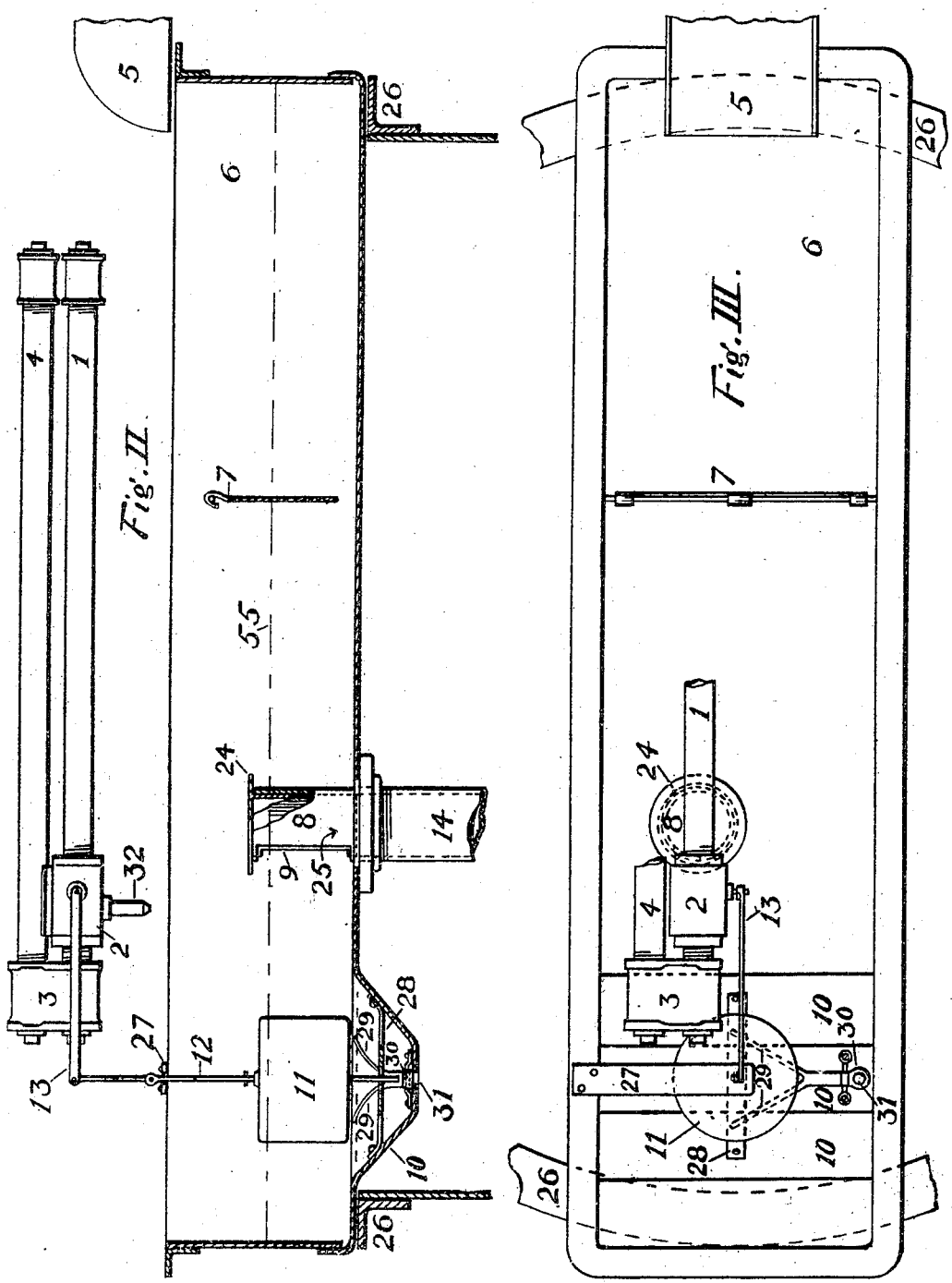

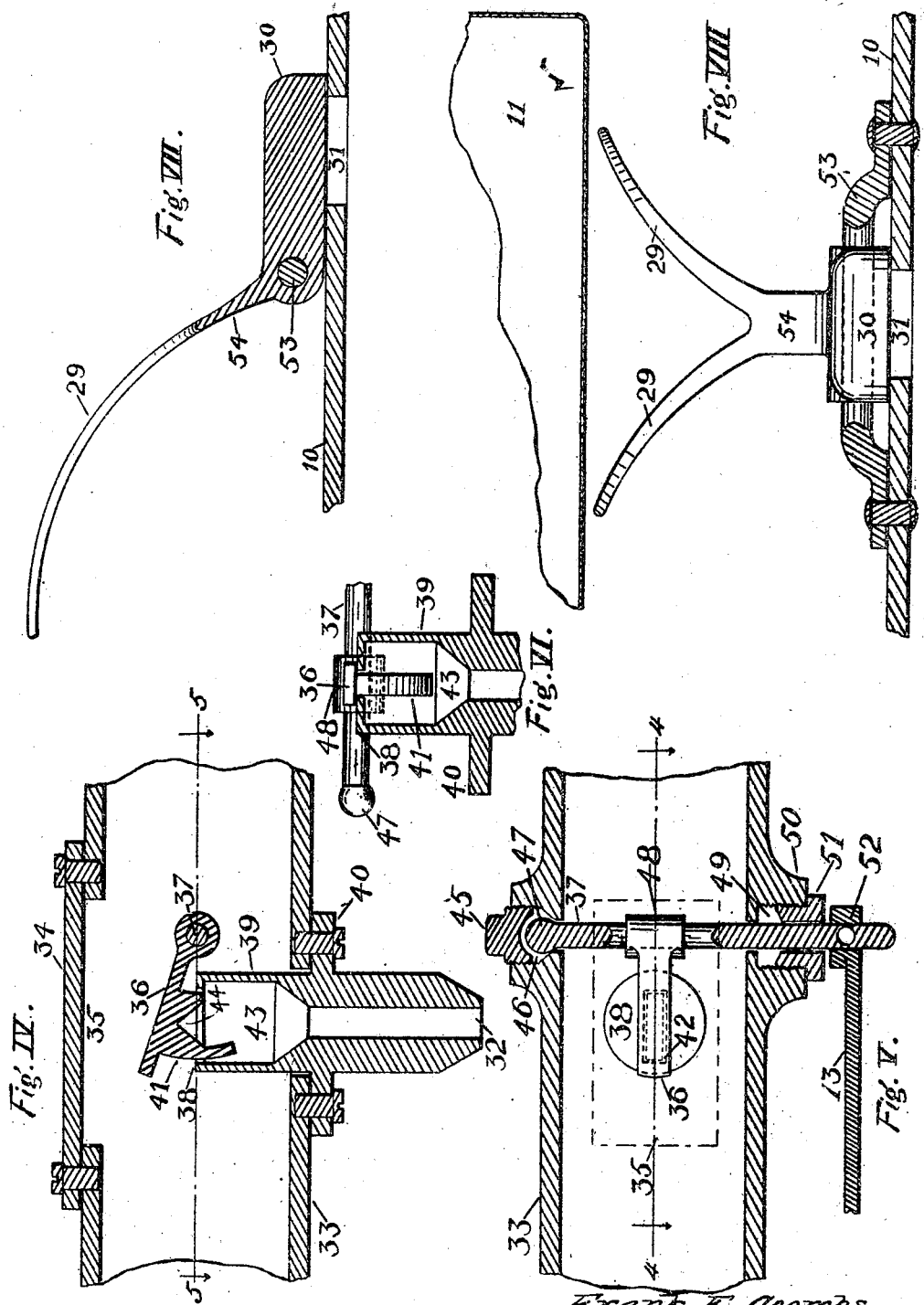

UNITED STATES PATENT OFFICE.

FRANK E. COOMBS, OF NATICK, MASSACHUSETTS.

DEFECATION OF SACCHARINE LIQUIDS.

958,907. Specification of Letters Patent. Patented May 24, 1910.

Application filed January 2, 1909. Serial No. 470,405.

*To all whom it may concern:*

Be it known that I, FRANK E. COOMBS, a citizen of the United States, residing at Natick, in the county of Middlesex and State of Massachusetts, have invented certain new and useful Improvements in Defecation of Saccharine Liquids, of which the following is a specification.

This invention relates to defecation of saccharine liquids; and it comprises an organization of apparatus elements adapted to receive a flowing current of sugar juices, obviate irregularity of flow in the same and maintain an averaged depth of liquid, to supply milk of lime of standard composition to said current in amount proportioned to said averaged depth and to produce other and coöperating results; all as more fully hereinafter set forth and as claimed.

In the art of sugar making, it is customary to treat raw sugar juices, prior to heating or boiling the same, with sufficient lime to bring the reaction to neutrality or to any desired point short of or beyond neutrality, the particular point chosen depending upon the particular juice and the particular method of defecation chosen. This may be readily done in discontinuous work, as in liming a stationary body of juice in a suitable tank, but is somewhat difficult in treating a flowing current, as is desirable in practice. It is desirable to lime the juice in transit flowing from the mill or diffuser to the defecating apparatus. In practice milk of lime is usually employed for liming, dry lime being difficult to handle while lime water is too dilute. But as milk of lime is a mere suspension, it is difficult to maintain it of standard composition, lime settling out, or to add lime by its aid in exact amounts. In practice, the milk of lime is sometimes added by allowing it to drip from a hand-regulated valve into a flowing body of sugar juice with no regard for the exact amount of juice happening to pass in such current at a given moment, the adjustment of the valve being altered from time to time as the appearance of the juice indicates underliming or overliming. It is however very desirable that the amount of lime added to the juice be regulated with great exactness since this exact liming is necessary to attain a maximum quantity and quality of sugar in later operations. In doing this a number of conditions must be met. The juice as it comes from the prime source, whether mill or diffuser, comes very irregularly, the quantity varying from minute to minute while the flow is usually more or less spurting. It is necessary therefore that the flow be evened as much as possible and it is also necessary that the liming be commensurate with the amount of juice flowing at any given moment. In the present invention therefore, I receive the juice from the prime source into a conduit large enough to form an averaged body and in this conduit I place a yielding frictional resistance adapted to average out violent fluctuations of flow. After producing a milk of lime of standardized composition, I keep this milk in continual circulation in a closed circuit, whereby settling is prevented and constant composition secured. Portions of this standard milk of lime flowing in this circuit are diverted through a special valve and delivered to the current of sugar juice, the amount so delivered being made strictly proportional to the average height of liquid in said conduit by a suitable float valve.

I have shown, more or less diagrammatically, certain embodiments of apparatus elements within the described invention in the accompanying illustrations.

In this showing:—Figure 1 is a view partly in vertical section, of a combination of apparatus elements suited to the purposes to be described, and exhibiting the general structure and arrangement of the invention; Fig. 2 is a fragmentary view, partly in side elevation and partly in section of one part of the structure of Fig. 1; Fig. 3 is a plan view, of the device shown in Fig. 2; Fig. 4 is a vertical, longitudinal section of a form of meter-valve found especially suited to my purpose; Fig. 5 is a plan view from above and partly in section of said valve; Fig. 6 is a partly sectional detail of the internal cap and seat of the said valve; Fig. 7 is a vertical section of a drainage valve and outlet located on the bottom of the float well; and Fig. 8 is an elevation of the drainage valve and outlet, taken from the front and partly in section.

In the showing of Fig. 1, element 1 is a pipe through which a pump, (not shown) may cause a stream of milk of lime of standardized composition to pass continuously past the valve 2 and through the return bend 3 and the return pipe 4, in closed circuit, said pipe 4 conducting the milk of lime into a stirring tank, (not shown.) The said tank, in connection with the pump, valve and piping, provides means for a constant circulation in closed circuits of milk of lime at sufficient speed to prevent settling out, during transit, of the undissolved portions of said milk of lime, thus maintaining it of homogeneous composition. Element 5, is a prime conduit or canal, delivering sugar juices derived from any suitable source, into one end of a conduit, 6, having vertical sides and ends, and, preferably, a flat bottom, said conduit being provided with a frictional resistance, shown as a baffle plate, 7, of any suitable form, which may be, as is shown, a simple plate of area less than the section of the conduit and loosely suspended across it, and said conduit is further provided with a slotted outlet pipe, 8, fitted with an internal, slotted sleeve, 9, as shown, or with an external and slotted collar, said outlet pipe projecting also downwardly through the bottom of the conduit; and the said conduit is provided further with a depressed portion, or well, 10, of a convenient size and form to contain the float, 11, the said float actuating the lime valve, 2, by means of the jointed rod, 12, and the valve lever, 13, and also actuating a drainage valve, at 30, (see Figs. 2 and 3.) The slotted outlet pipe, 8, communicates by means of a downwardly extending portion, 14, with the interior of a preferably circular tank, 15, having a conical bottom, 16, through the lowermost part of which its contents can be drawn off continuously by means of the pipe, 17, and any ordinary balanced valve connected therewith (not shown), which is to be actuated by the float, 18, and its connected rod and lever, 19, and 20, said float, 18, being so placed as to maintain a constant level of the contents of the tank, at any desired height, as at the line 21: and the said tank is also provided with a pipe, 22, through which a steady current of air may be forced by any preferred or customary means into the lowest part of the contents of the said tank through the multiple outlets, 23.
In the showing of Figs. 2 and 3, certain elements of my invention are more clearly exhibited, such as the flange, 24, of the sleeve, 9, by which the said sleeve is rotatably movable within the slotted discharge member, 8, in such a manner as to regulate the discharge area into said member by alteration of the width of the coincident portions of the two slots, and which coincident portions offer free passage, at 25 (Fig. 2) for the contents of the conduit, 6 into the pipes 8, and 14, and so into the tank, 15, the flanges of said tank being indicated at 26, in Figs. 2 and 3. In Figs. 2 and 3 are also shown the guides, 27, and 28, for the float-rod, 12, and the lever arms, 29, of the drainage valve, 30, (see Figs. 7 and 8) said valve opening by the weight of the float, 11, which depresses said arms, raising the valve portion, 30, and uncovering the drainage aperture, 31, in the bottom of the well, 10, allowing the contents of said well to flow into the tank, 15, whenever the said float is in its lowest position, said opening remaining covered and nonpermeable whenever the float is raised into its higher positions, as the heavier part, 30, of the drainage member will fall by its own weight whenever not sustained by the pressure of the float upon the lever arms.

In the showing of Fig. 2, element 32 is the discharge member of the lime meter-valve, 2, placed so that the flow of milk of lime therefrom shall fall into the sugar liquor in the conduit, 6, at a point close to the line of flow into the outlet of the member, 8, and immediately mingle with the said liquor during its passage through the pipe, 14, and into the tank, 15.

In the showing of Fig. 4, element 33 is a broken-away showing of the body of the lime valve, 34 is a plate removably fastened thereupon to cover an inspection port, 35, which, upon lifting the said cover plate, gives free access to the cap, 36, pivoted upon the spindle, 37, and having its seat upon the upper, internal, flat portion, 38, of the valve tube, 39, said tube having a collar, 40, forming a continuous part of the tube and by which it is fastened removably to the valve body below and exteriorly, said tube terminating at a discharge orifice, 32. The pivoted cap, 36, has a notched and curved guide, 41, projecting from its lower face, said guide passing smoothly through a rectangular slot, 42, into a chamber 43, hollowed in the upper part of the bore of the valve tube, 39; and the triangular notch, 44, with the rising of the cap, exposes a rectangular aperture for the passage of milk of lime from the interior of the valve into the valve tube and out through its discharge orifice, the said rectangular aperture varying in its open section directly with the rise and fall of the cap and guide, and thus directly and in due ratio controlling the flow of milk of lime therethrough.

In the showing of Fig. 5, element 45, is a plug, closing an inwardly tapered orifice, 46, in a side boss of the valve body; the spindle, 37, passing through said orifice until its enlarged end 47, makes a bearing against the taper of said orifice, said spindle continuing through the perforated lug, 48, of the valve cap, said lug being firmly fastened to said spindle, which extends out of the other side of the valve body through a packing space, 49, in a boss, 50, and through a gland, 51, and has rigidly fixed upon its outer extremity, at 52, the valve lever, 13.

In the showing of Fig. 6, 39 is a vertical cross section of the valve tube, and in elevation from the front or free end, are seen the spindle, cap and notched cap-guide, numbered as in preceding figures.

In the showing of Figs. 7 and 8, 53, is a bent rod fastened to the bottom of the float well, 10, in the conduit, 6, and upon said rod is pivoted a device for opening and closing a drainage aperture, 31, said device consisting of the valve portion, 30, and the lever portion, 54, the latter upwardly diverging into two lever arms, 29, said device as a whole pivoted as stated on the rod, 53, and with a free-swinging motion on said pivot; and the valve portion, 30, is intentionally made heavy in order that, when the lever arms are free from the weight of the float, 11, it will fall of its own weight and close the drainage aperture, 31.

In the use of my process and the combined devices I have invented for its convenient employment, raw sugar juice is received from the source, 5, into the conduit, 6, at one end thereof and, passing the baffle, 7, this becomes a smooth-surfaced moving body of liquid therebeyond, said body of liquid accumulating in the said conduit until it reaches an averaged level, as at 55, (see Fig. 2) where the adjustable slot, 25, in the member, 8, offers area sufficient for the passage of all the liquid that is received into the said conduit; and the surface of the sugar juice will remain at or near this averaged level so long as the juice continues to flow into said conduit in a full stream. The float, 11, rising as the juice enters, will pass above the point at which it can depress the lever arms, 29, of the drainage member, and this will at once close the aperture through the bottom of the float well by the fall of the valve portion of the said device. The float, 11, in rising, will also, by means of the connected rod and valve lever, open the lime-meter valve and permit milk of lime to escape through the outlet into the body of sugar juice in the conduit, 6, near the opening of the slotted members, 8, and 9; and as the said rod and lever arm will follow the movement of the float, 11, the quantity of lime delivered by the valve, 2, will be in proportion to the said movement, and to the rise or fall of the sugar juice in the conduit, 6. And to adjust this delivery of milk of lime accurately to the requirements of the process, the sleeve, 9, is rotated by means of its flange, altering the area of the outlet into the discharge member, 8, until the level of the sugar juice in the said conduit brings the said float to a height at which the meter-valve delivers the correct amount of milk of lime for the best tempering of the said sugar juice, with which proper tempering this process is concerned and which is its principal object. And it is the additional function of the combination of elements described, to regulate automatically the proportion of milk of lime added to the sugar juice despite natural and unavoidable irregularities of supply of the sugar juice to the device through the primary conduit, 5, and this I effect by transmitting the major variations of level of liquor in the conduit, 6, induced by the said irregularities of supply, immediately to the notched guide in the meter-valve through the float and its connections, modifying the delivery of lime in the manner to maintain the desired ratio of milk of lime to the sugar juice, when this ratio has once been properly adjusted in the manner before stated by means of the slotted sleeve, 9. In consequence of the flow of liquid through the discharge member of the conduit and its passage through the bent downward continuation thereof into the tank, 15, the said tank will fill with correctly proportioned sugar juice and milk of lime until the level of its contents shall reach some determined point, (as 21, in Fig. 1), whereupon the float, 18, pendent therein, will be sufficiently raised to open, through the connections, 19, and 20, a balanced valve (not shown), and permit the contents of the said tank to be drawn off through the pipe, 17, as fast as they are supplied to the said tank from the said conduit and its discharge outlet. Meanwhile a continuous current of air is supplied from an appropriate source and forced into the bottom of the liquid through the pipe, 22, and the multiple outlets thereof, and the air, in its rapid passage upward through the liquor, will thoroughly agitate the said liquor, continuously and immediately blending the newly entered, limed sugar juice with the whole contents of the tank, in a manner to preserve at all times a constant average composition of the said contents, said contents thus being a considerable or dominant body, representative of the mean composition of the juice that may be supplied through the primary conduit, 5, over comparatively long periods of time; this constantly maintained average aiding materially in that ease of manipulation, uniformity and accuracy which will result in increased quantity and quality of the final product to be afterward extracted from the sugar juices.

What I claim as my invention and desire to secure by Letters Patent is:—

1. A defecating apparatus for sugar juices comprising a conduit, means for delivering a current of sugar juices to one end of said conduit, a flow equalizing device in the conduit, a discharge member therebeyond provided with a vertically slotted exit orifice, and a similarly slotted sleeve or collar movable with regard to said discharge member, means for delivering milk of lime into said sugar juice, controlled by the depth of liquid in said conduit between said equalizing device and said discharge member, and a receptacle arranged to maintain in active agitation and admixture a considerable and homogeneous body of said sugar juice and lime, into which said receptacle the said conduit continuously delivers the said sugar juice and lime, substantially as hereinbefore described.

2. A defecating apparatus comprising a conduit, means of delivering sugar juice into said conduit, a flow-equalizing device in said conduit, a discharge member for the said conduit provided with a vertically slotted orifice in said member and a slotted sleeve or collar movable with regard to said member, means for supplying milk of lime to liquid passing into said conduit in proportion to the quantity of juice passing into and from said conduit, a well, or float receptacle in connection with the bottom of said conduit, and a drainage aperture in the bottom of said well, covered by a valve actuated by the motion of the float and serving to drain the said well at times when said liquid ceases to flow into the said conduit.

3. In a defecating apparatus as described, means for a continuous and float-controlled supply of milk of lime to a body of sugar liquor, said means comprising a valve body through which a current of said milk of lime may be made to circulate, a removable cover plate closing a port giving access to the interior of said body, a removable valve tube fastened to the lower part of said body, projecting upwardly into said body and continued downwardly and externally of the body, said tube having a chamber formed by widening the upper part of its bore, and said chamber opening at its upper part by a horizontal, rectangular slot in which moves vertically a triangularly notched guide attached to a pivoted cover member, said cover member firmly fixed to a spindle to which rotary motion is imparted by lever and rod members connected with a float rising and falling with the level of the sugar liquor contained in a conduit hereinbefore described, and by the position of the notch relatively to the slot in the valve tube forming a variable, rectangular aperture for the outflow of the milk of lime, the area of said aperture varying in direct ratio to the motion of the said float member and thus also to the quantity of sugar liquor contained at any time between the members of the said juice conduit.

4. In a defecating apparatus for sugar juices as described, the combination of a receptacle to contain a considerable body of mingled sugar juices and milk of lime, means for continuously adding said commingled juice and lime thereto, with means for continuous agitation and thorough mixing of said body with the further portions of the same materials added continuously thereto, means for continuously withdrawing treated liquid from the receptacle, and means for maintaining a thoroughly mingled and uniform volume of said body in said receptacle during the continued simultaneous addition and withdrawal of the said materials.

5. A defecating apparatus comprising a source of sugar juices, means for converting such juices into a flowing current of averaged depth, means for maintaining milk of lime of constant composition and means for adding such milk of lime directly to said current in amounts proportional to the temporary depth of liquid therein.

6. A defecating apparatus comprising a source of sugar juices, a conduit receiving juices therefrom and adapted for the flow of a current therein, an upright slotted delivery member withdrawing juices from the conduit, lime-delivery means delivering lime to the current in the conduit in proximity to said slotted member and a float in said conduit controlling said lime-delivery means.

7. A defecating apparatus comprising a source of sugar juices, a conduit receiving juice therefrom, an upright slotted delivery member withdrawing juice from said conduit, lime delivering means in proximity to said slotted member, a float in said conduit controlling said lime delivery means and a frictional resistance interposed between slotted member and the source of juices.

8. A defecating apparatus comprising a source of sugar juices, a conduit receiving juice therefrom, an upright slotted delivery member withdrawing juice from said conduit, lime delivering means in proximity to said slotted member, a float in said conduit controlling said lime delivery means and a swinging baffle suspended in said conduit between the slotted member and the source of juice.

9. A defecating apparatus comprising a source of sugar juices, a conduit receiving juice therefrom, an upright slotted member in said conduit and provided with means for adjusting the width of the slot therein for withdrawing juice from said conduit, lime delivery means delivering lime in proximity to said slotted member and a float in said conduit controlling the delivery of lime.

10. A defecating apparatus comprising a source of sugar juices, a conduit receiving juice therefrom, withdrawal means adapted to produce an averaged height of juice current in said conduit during flow from such source, liming means adapted to supply an amount of lime to the current in the conduit proportional to said height and means for emptying the conduit on a cessation of flow.

11. A defecating apparatus comprising a conduit for the flow of sugar juices, means for delivering juice to and withdrawing juice from said conduit adapted to preserve an averaged height of juice therein, a float mounted in said conduit, valve means controlled by said float adapted to empty said conduit at a cessation of juice flow therein and valve means, also controlled by said float, adapted to deliver an amount of milk of lime into said conduit proportioned to the temporary height of liquid therein.

12. A defecating apparatus comprising a conduit adapted for flow of sugar juices, a float valve mounted therein and a liming device delivering lime to said conduit and controlled by said float, said liming device comprising means for maintaining milk of lime in circulation and a valve connected to said float having a triangular inlet orifice receiving such milk of lime and varying in area presented thereto with the rise and fall of the float.

13. In a defecating apparatus, a liming device comprising means for circulating milk of lime in a conduit, a discharge tube leading from such conduit, a flap valve mounted to engage the top of such tube and a triangularly notched downward prolongation of the flap valve adapted to enter into the top of the tube.

14. In a defecating apparatus, a vessel adapted to contain sugar juices, a float mounted in said vessel and a liming device adapted to deliver milk of lime into said vessel, said liming device comprising means for circulating a body of milk of lime, a valve tube adapted to withdraw milk of lime from said body, a flap valve adapted to engage the top of such tube and connected to said float, and a triangularly notched downward prolongation of the flap valve adapted to enter into the top of the tube.

In testimony whereof, I affix my signature in the presence of witnesses.

FRANK E. COOMBS.

Witnesses:
C. A. Dowse,
H. A. Leavitt.